United States Patent
Becker

(10) Patent No.: US 7,664,809 B2
(45) Date of Patent: Feb. 16, 2010

(54) METHOD AND DEVICE FOR CALCULATING MODULO OPERATIONS

(75) Inventor: Burkhard Becker, Ismaning (DE)

(73) Assignee: Infineon Technologies AG (DE)

( * ) Notice: Subject to any disclaimer, the term of this patent is extended or adjusted under 35 U.S.C. 154(b) by 1249 days.

(21) Appl. No.: 10/884,724

(22) Filed: Jul. 2, 2004

(65) Prior Publication Data

US 2005/0004967 A1     Jan. 6, 2005

Related U.S. Application Data

(63) Continuation of application No. PCT/DE02/04714, filed on Dec. 23, 2002.

(30) Foreign Application Priority Data

Jan. 4, 2002   (DE)  ................ 102 00 133

(51) Int. Cl.
    *G06F 7/38*    (2006.01)
(52) U.S. Cl. .................................... 708/491
(58) Field of Classification Search ........ None
See application file for complete search history.

(56) References Cited

U.S. PATENT DOCUMENTS

| | | | |
|---|---|---|---|
| 5,499,299 A | 3/1996 | Takenaka et al. | 380/28 |
| 5,572,454 A | 11/1996 | Lee et al. | 364/746.1 |

FOREIGN PATENT DOCUMENTS

EP     0 402 532 A1     12/1990

OTHER PUBLICATIONS

Technical Specification 3GPP TS 25.212 V3.5.0 (200-12), 3rd Generation Partnership Project; Chapters 4.2.3.2.3.1, 4.2.3.2.3.2, 4.2.3.2.3.3, 1999.

*Primary Examiner*—Tan V Mai
(74) *Attorney, Agent, or Firm*—Dickstein, Shapiro, LLP.

(57) ABSTRACT

A method for calculating a modulo operation a mod p uses a table (1) containing the values $n*p$ for $n=1, 2, \ldots$ . In this case, a and p are positive integers where a mod $p=a-\underline{n}*p$. An integral hypothesis $n_H$ is calculated for the unknown value $\underline{n}$. Afterwards, the values $n_H*p$ and also at least one adjacent value $(n_H+1)*p$ and/or $(n_H-1)*p$ are looked up in the table (1). The expressions $a-n_H*p$ and also $a-(n_H+1)*p$ and/or $a-(n_H-1)*p$ are calculated and at least one of these expressions is compared with the value 0. $\underline{n}$ is thereupon determined.

14 Claims, 4 Drawing Sheets

METHOD AND DEVICE FOR CALCULATING MODULO OPERATIONS

CROSS-REFERENCE TO RELATED APPLICATION

This application is a continuation of copending International Application No. PCT/DE02/04714 filed Dec. 23, 2002 which designates the United States, and claims priority to German application no. 102 00 133.2 filed Jan. 4, 2002.

TECHNICAL FIELD OF THE INVENTION

The present invention generally relates to methods and devices for calculating modulo operations.

DESCRIPTION OF RELATED ART AND BACKGROUND OF THE INVENTION

The calculation of a remainder r which arises when dividing an integer a by an integer p plays an important part in a wide variety of areas of information and communication technology. The operation for determining the remainder r is referred to as a modulo operation and specified by the mathematical expression r=a mod p.

A specific area of application in which large numbers of modulo operations are executed concerns the turbo (de-)interleaving algorithm during the interleaving or deinterleaving of a bit stream in accordance with a mobile radio standard, in particular UMTS (universal mobile telecommunication system). In mobile radio technology, the data bits to be sent are interleaved in blocks according to a specific interleaving specification, as a result of which the signal to be sent is afforded a degree of robustness with respect to momentary disturbances. In the receiver, the received data bit stream has to be deinterleaved again in order to re-establish the original order of the bits.

In the UMTS standard, the interleaving or deinterleaving specification is represented by a two-dimensional coordinate transformation matrix set up in a manner dependent on the block size of the data stream to be interleaved or deinterleaved. The set-up specification for calculating a coordinate of the transformation matrix comprises carrying out a plurality of modulo operations.

At the present time, the modulo operations are calculated under software control by means of a signal processor. What is disadvantageous in this case is that conventional signal processors require of the order of 10 to 20 machine cycles (in the case of a word width of 16 or 32 bits) for the calculation of a modulo operation, i.e. a considerable expenditure of time is incurred.

If the range of values of the input variable a is restricted, a simple possibility for calculating the modulo operation a mod p would consist in storing all values n*p for n=1, 2, ... in a memory and then reading them out in the direction of ascending values (i.e. ascending n). As soon as that value n*p is reached for which a−n*p≧0 and a−(n+1)*p<0 holds true, the remainder are sought results as r=a−n*p.

This method enables the modulo calculation to be realized in hardware, but requires a high number of memory accesses.

SUMMARY OF THE INVENTION

The invention is based on the object of providing methods which enable modulo operations to be calculated with a low expenditure of time. Furthermore, the invention aims to specify devices for rapidly calculating modulo operations, which, in particular, are also intended to be able to be realized in the form of hardware circuits. In particular, the intention is to be able to use the methods and devices for the calculation of modulo operations during interleaving or deinterleaving in accordance with the UMTS standard in a favourable manner in respect of outlay.

The objective on which the invention is based can be achieved by a method for calculating a modulo operation a mod p using a table containing the values n*p for n=1, 2, ... where a and p are positive integers and a mod p=a−$\underline{n}$*p, comprising the steps:

calculating an integral hypothesis $n_H$ for the unknown value n;

looking up the value $n_H$*p and also at least one adjacent value $(n_H+1)$*p and/or $(n_H-1)$*p in the table;

calculating the expression a−$n_H$*p and also at least one of the expressions a−$(n_H+1)$*p and/or a−$(n_H-1)$*p and comparing at least one of these expressions with the value 0; and outputting the value a−$\underline{n}$*p determined on the basis of the comparison.

Calculating the integral hypothesis $n_H$ may comprise the steps of:

calculating a first approximation value for a/p of the form $a/2^x$, where x is a positive integer and is determined such that $2^x \leq p < 2^{x+1}$ holds true;

calculating $n_H$ from the first approximation value by disregarding the places after the decimal point of the approximation value.

Calculating the integral hypothesis $n_H$ may comprise the steps of:

calculating a first approximation value for a/p of the form $a/2^x$, where x is a positive integer;

calculating a correction value of the form $p/2^x$;

inverting the correction value;

calculating a second approximation value as a product of the first approximation value and the inverted correction value; and calculating $n_H$ from the second approximation value by disregarding the places after the decimal point of the second approximation value.

The value x can be determined such that $2^x \leq p < 2^{x+1}$ holds true. The first approximation value can be calculated by right shifting the binary representation of a by x places. The least significant bit of the binary representation of the first approximation value may have the significance $2^0$. The correction value can be calculated by right shifting the binary representation of p by x places. The least significant bit of the binary representation of the correction value may have the significance $2^{-t}$, where t is an integer greater than or equal to 1, in particular t=5. The value of s(i)=a mod p where a=v*s(i−1) may hold true, where p is a prime number and v is an integer. The method can be used for calculating the intra-row permutation in the course of interleaving and/or deinterleaving according to the specification given in the UMTS standard 3GPP TS 25.212.

The object can also be achieved by a device for calculating a modulo operation a mod p, where a and p are positive integers and a mod p=a−$\underline{n}$*p, comprising a table containing the values n*p for n=1, 2, ..., a unit for calculating an integral hypothesis $n_H$ for the unknown value $\underline{n}$, a unit for looking up the value $n_H$*p and also at least one adjacent value $(n_H+1)$*p and/or $(n_H-1)$*p in the table, a unit for calculating the expressions a−$n_H$*p and also a−$(n_H+1)$*p and/or a−$(n_H-1)$*p and comparing at least one of these expressions with the value 0, and a unit for outputting the value a−$\underline{n}$*p determined on the basis of the comparison.

The unit for calculating an integral hypothesis $n_H$ may contain a shift register, which carries out right shifting of the binary representation of the value of a by x places, where x is a positive integer and is determined such that $2^x \leq p < 2^{x+1}$ holds true. The unit for calculating an integral hypothesis $n_H$ may furthermore comprise a ROM table with $2^{t+1}$ entries and t+1 shift and addition stages, where t is a positive integer, in particular t=5. The device may further comprise a state generator for calculating the values n*p for the entries of the table.

The object can also be achieved by a method for calculating a sequence of modulo operations (j*q) mod (p−1) for the running index j=0, 1, 2, ..., where q and p are positive integers, by means of a recursion during which, for the calculation of the modulo operation with respect to the running index j=n+1, recourse is had to a transfer variable ($n_p$) which was calculated during the already effected calculation of the modulo operation with respect to the running index j=n.

The method may comprise the initial step of calculating a value dp=int[q/(p−1)], where int is an integer function; and with a recursion comprising the following steps (i) for a value n of the running index j, calculating the transfer variable $n_p$, in such a way that $n_p$*(p−1) is less than (j*q) and ($n_p$+1)*(p−1) is greater than (j*q), where $n_p$ is a positive integer; and (ii) for the value n+1 of the running index j, calculating the values (n+1)*q, ($n_p$+dp)*(p−1) and ($n_p$+dp+1)*(p−1); if (n+1)*q≧($n_p$+dp+1)*(p−1) holds true, choosing ((n+1)*q) mod (p−1)=(n+1)*q−($n_p$+dp+1)*(p−1) and increasing $n_p$ by dp+1;—otherwise choosing ((n+1)*q) mod (p−1)=(n+1)*q−($n_p$+dp)*(p−1) and increasing $n_p$ by dp.

The object may also be achieved by a device for calculating a sequence of modulo operations (j*q) mod (p−1) for the running index j=0, 1, 2, ..., where q and p are positive integers, comprising a first calculation stage for calculating the modulo operations with respect to the running index j in a manner dependent on a transfer variable calculated with respect to the running index j−1, and a second calculation stage, which calculates the transfer variable.

The device may further comprise one or more multipliers for calculating the values (n+1)*q, ($n_p$+dp)*(p−1) and ($n_p$+dp+1)*(p−1), where j=n+1 is the current running index, $n_p$ is a positive integer, and dp=int[q/(p−1)], where int is an integer function, a comparator, which ascertains whether or not (n+1)*q≧($n_p$+dp+1)*(p−1), one or more subtractors for calculating ((n+1)*q) mod (p−1)=(n+1)*q−($n_p$+dp)*(p−1) or ((n+1)*q) mod (p−1)=(n+1)*q−($n_p$+dp+1)*(p−1) in a manner dependent on the comparison result, and an adder, which increases $n_p$ by dp or dp+1 in a manner dependent on the comparison result. The device may further comprise a first counter for generating the value j for the running index. The device may further comprise a second counter for calculating the integral transfer value $n_p$.

In accordance with a first aspect of the invention, in the case of a method for calculating modulo operations a mod p, use is made of a table containing the values n*p for n=1, 2, ..., where a and p are positive integers and a mod p=a−$\underline{n}$*p, and the following steps are carried out: calculating an integral hypothesis $n_H$ for the unknown value $\underline{n}$; looking up the value $n_H$*p and also at least one adjacent value ($n_H$+1)*p and/or ($n_H$−1)*p in the table (1); calculating the expression a−$n_H$*p and also at least one of the expressions a−($n_H$+1)*p and/or a−($n_H$−1)*p and comparing at least one of these expressions with the value 0; and outputting the value a−$\bar{n}$*p determined on the basis of the comparison.

Consequently, an essential standpoint of the invention in accordance with the first aspect is that not all the values stored in the table have to be looked up, but rather only a few of these values. The calculation of the different expressions a−n*p and also the comparison thereof with the value 0 likewise only have to be performed for these few (preferably two or three) values formed on the basis of the hypothesis $n_H$. A fast algorithm results as a consequence of this. When implemented in hardware, this method can be carried out with a significantly smaller number of machine cycles than is the case during a software-controlled calculation of the modulo operation. Moreover, this method is independent of the word width of the values a and p.

A particularly preferred refinement of the method is characterized in that calculating the integral hypothesis $n_H$ comprises the steps of: calculating a first approximation value for alp of the form $a/2^x$, where x is a positive integer and is determined such that $2^x \leq p < 2^{x+1}$ holds true; calculating $n_H$ from the first approximation value by disregarding the places after the decimal point of the approximation value.

If p is a power with respect to base 2, the hypothesis $n_H$ is already the value n sought. This method for calculating $n_H$ is likewise sufficient for values of p lying in the vicinity of a power of two.

An alternative calculation method is characterized in that calculating the integral hypothesis $n_H$ comprises the steps of: calculating a first approximation value for alp of the form $a/2^x$, where x is a positive integer; calculating a correction value of the form $p/2^x$; inverting the correction value; calculating a second approximation value as a product of the first approximation value and the inverted correction value; and calculating $n_H$ from the second approximation value by disregarding the places after the decimal point of the second approximation value.

What is achieved by the calculation of the correction value is that, even in the case of values of p which do not lie in the vicinity of a power of two, looking up two or at most three values from the table is always sufficient to solve the modulo operation.

The fact that both the first approximation value and the correction value can be calculated by simple right shifting of the corresponding binary representation (of a or p) by x places results in simple hardware realisations for carrying out these computation steps.

The least significant bit of the binary representation of the correction value preferably has the significance $2^{-t}$, where t is an integer greater than or equal to 1. The choice of t makes it possible to set the accuracy of the calculation of the correction value and thus the accuracy of the calculation of the second approximation value. In many cases (e.g. in the event of UMTS interleaving or deinterleaving), t≦5 is sufficient.

A device for calculating module operations a mod p according to the first aspect of the invention comprises a table containing the values n*p for n=1, 2, ... a unit for calculating an integral hypothesis $n_H$ for the unknown value n, a unit for looking up the value $n_H$*p and also at least one adjacent value ($n_H$+1)*p and/or ($n_H$−1)*p in the table, a unit for calculating the expressions a−$n_H$*p and also a−($n_H$+1)*p and/or a−($n_H$−1)*p and comparing these with the value 0, and a unit for outputting the value a−n*p determined on the basis of the comparison.

The unit for calculating an integral hypothesis $n_H$ preferably comprises a shift register for carrying out right shifting of the binary representation of the value of a and furthermore preferably has a ROM table with $2^{t+1}$ entries and t+1 shift and addition stages, where t is a positive integer.

According to a second aspect of the invention, the objective on which the invention is based is achieved by means of a method and a device for calculating sequences of modulo operations $(j*q)$ mod $(p-1)$ where $j=0, 1, 2, \ldots$.

In this case, the modulo operation is calculated by means of a recursion method which has recourse inductively to a result (transfer value $n_p$) which was obtained during the calculation in the preceding recursion step. In this way, the modulo operations can be solved progressively for input variables of the form $(j*q)$.

BRIEF DESCRIPTION OF THE DRAWINGS

The invention is described below using examples with reference to the drawing, in which.

DETAILED DESCRIPTION OF EMBODIMENTS

Figure 1:
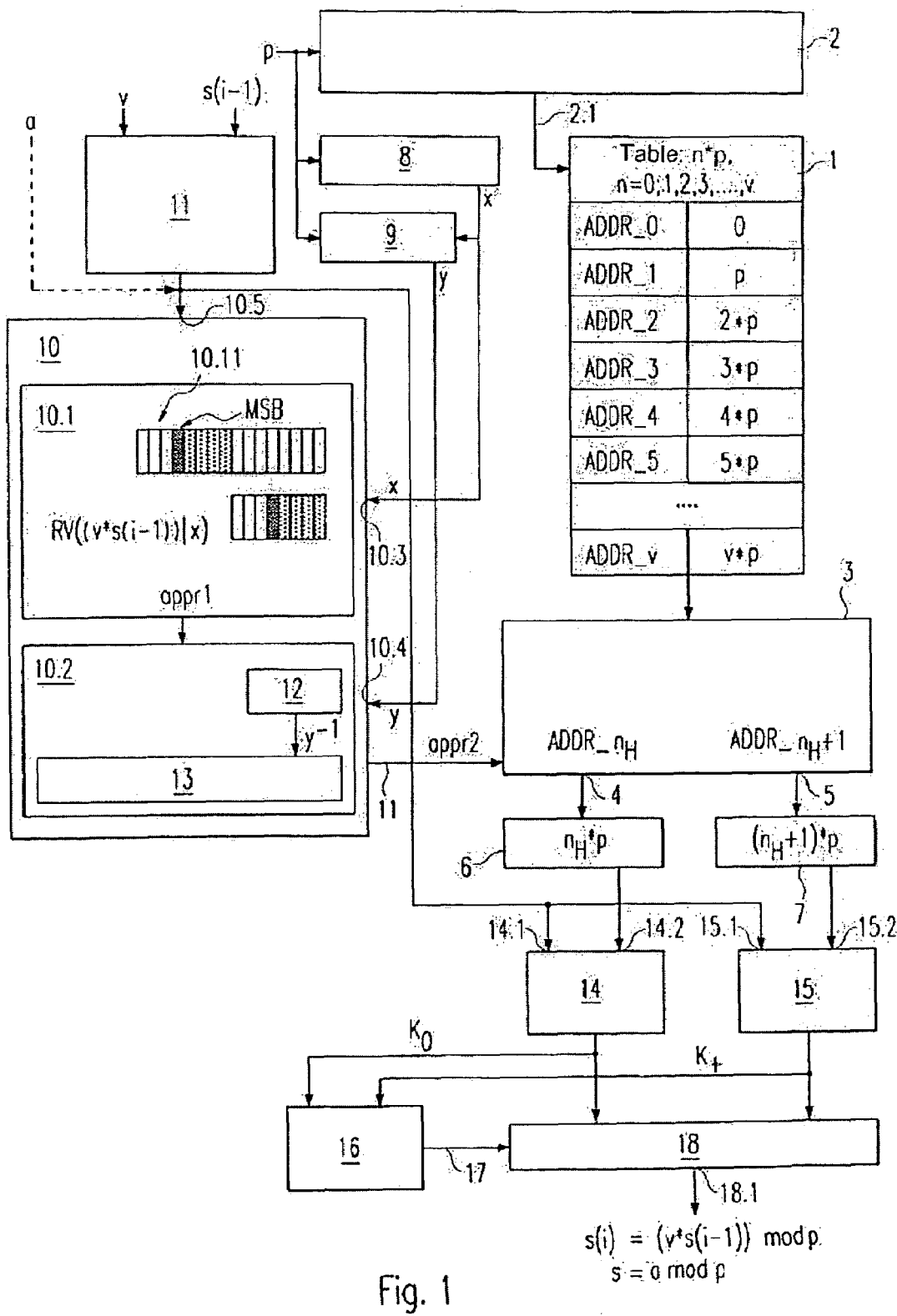
FIG. 1 shows a schematic illustration of a circuit example in accordance with the first aspect of the invention.

In the case of the UMTS standard, the block size is between 40 and 5114 bits. The interleaving specification (permutation) is given by a two-dimensional coordinate transformation matrix. The latter is completely determined by the block size. It has a number of 5, 10 or 20 rows and a suitable number of columns, depending on the block size.

The interleaving procedure consists in an intra-row permutation, an inter-row permutation and a pruning of the output bits of this coordinate transformation matrix. The corresponding steps are specified in chapters 4.2.3.2.3.1 (definition of the coordinate transformation matrix), 4.2.3.2.3.2 (intra-row permutation, inter-row permutation) and 4.2.3.2.3.3 (pruning) of the technical specifications 3GPP TS 25.212 V3.5.0 (2000-12) and are incorporated by reference in the content of this document.

Two modulo operations have to be executed during the intra-row permutation:

$$s(i)=(v*s(i-1)) \bmod p; \ i=0,1,\ldots,(p-2); \ s(0)=1 \quad (1)$$

$$(j*q_i) \bmod (p-1); \ j=0,1,\ldots,(p-2) \quad (2)$$

The modulo operation (1) serves to generate the so-called basis sequence $s(i)$ for the intra-row permutation (see chapter 4.2.3.2.3.2, point 2 of the abovementioned standards), while the modulo operation (2) specifies the permutation specification for the i-th intra-row permutation (see chapter 4.2.3.2.3.2, point 5 of the abovementioned standards, i is the row index of the coordinate transformation matrix). In the UMTS standard, p designates a prime number between 7 and 257, and v is the so-called primitive root and has a value of between 2 and 19. In the UMTS standard, $q_i$ designates the sequence of so-called minimal prime numbers.

A detailed description of the use of the modulo operations (1) and (2) in the UMTS standard is not necessary for understanding the invention and is therefore not given here.

The circuit examples for calculating the two modulo operations (1) and (2) explained below with reference to FIGS. 1-4 are explained using the mathematical notation introduced above with respect to the UMTS standard, but the variable $q_i$ is given simply as q hereinafter. However, the circuits and also the method can be applied not just to the calculation of modulo operations in the UMTS standard. In this respect, the invention encompasses the following generalizations:

p and q need not be prime numbers, but rather may generally represent positive integers;

the product $v*s(i-1)$ may be replaced by an arbitrary input variable a, which is likewise a positive integer. In this case, the modulo operation (1) reads (1') $s=a \bmod p$ the range of values of a being restricted;

the term $(p-1)$ in the second modulo operation (2) may be replaced by p provided that the said operation is considered independently of the first modulo operation (1).

FIG. 1 shows a circuit for calculating the modulo operation (1) or (1').

The circuit comprises a table 1, in which the multiples of the number p, i.e. $p*n$, where $n=0, 1, 2, \ldots, v$, are stored. The address assigned to the multiple $n*p$ is designated by ADDR_n. If a maximum input value $a_{max}$ is considered in the general case, $v=\text{int}[a_{max}/p]$ is chosen. In this case, $\text{int}[a_{max}/p]$ designates the integer function applied to the quotient $a_{max}/p$, the said integer function having the effect that v is a positive integer.

On the input side, the table 1 is connected via a data connection 2.1 to a state generator 2, which supplies the products $n*p$, $n=0, 1, 2, \ldots, v$.

An output of the table 1 is selected by an address determining unit 3, which generates two addresses ADDR_$n_H$ and ADDR_$n_H$+1 and reads out the associated products $n_H*p$ and $(n_H+1)*p$ from the table 1 and provides them at two outputs 4 and 5, respectively.

The outputs 4 and 5 are respectively connected to a memory 6 and 7 for storing the products $n_H*p$ and $(n_H+1)*p$.

In addition to the state generator 2, the number p is fed to a first calculation unit 8 for calculating a place shift x and to a second calculation unit 9 for calculating a correction value y.

The place shift x is that power of 2 (i.e. 2x) which satisfies the relationship $$2^x \leq p < 2^{x+1}$$

The correction value y is calculated in the second calculation unit 9 in accordance with the expression $$y = RV(p|x)$$

In this case, $RV(p|x)$ designates right shifting of the binary representation of the number p by x places. In this case, e.g. six significant bits (of the significances 1, ½, ¼, ⅛, 1/16, 1/32) may be taken into consideration for y.

The numbers x and y are forwarded to an address generator 10 via the inputs 10.3 and 10.4, respectively. The address generator 10 has a further input 10.5, via which it receives either the input value a (case (1')) or the product $v*s(i-1)$ (case (1)). In the second case, the circuit contains a multiplier 11 for calculating the said product.

The address generator 10 comprises two modules 10.1 and 10.2. The first module 10.1 serves for calculating a first approximation value appr1, which represents a first approximation for the jump address of the table 1 that is sought.

For this purpose, the first module 10.1 comprises a shift register 10.11, in which the binary representation of the input value a or of the product $v*s(i-1)$ is stored. The storage cell of the shift register 10.11 that contains the most significant bit MSB is illustrated such that it is filled in in FIG. 1, and the four subsequent storage cells are illustrated in shaded fashion.

In order to calculate the first approximation value appr1, right shifting by x places is carried out in the shift register 10.11, i.e.

$$appr1 = RV(a|x) \text{ or } appr1 = RV((v*s(i-1))|x).$$

The places after the decimal point can be discharged during the right shifting, which has the consequence that appr1 is a positive integer.

A first possibility (not illustrated) consists in using appr1 for driving the address determining unit 3. A sufficiently high accuracy of appr1 cannot however be guaranteed for all values of p.

Therefore, in accordance with FIG. 1, the first approximation value appr1 is forwarded to the second module 10.2, which calculates an improved second approximation value appr2 taking the value y into consideration. The said second approximation value is forwarded to the address determining unit 3 at an output 11 of the address generator 10.

The second module 10.2 calculates the second approximation value appr2 in accordance with the relationship $$appr2 = appr1 * y^{-1}.$$

For this purpose, the second module 10.2 may comprise a ROM table 12 and shift and addition stages 13.

The inversion of the value y into the value $y^{-1}$ is effected by means of the ROM table 12. Assuming that y has a bit width of 6, the ROM table has to have $2^6 = 64$ entries.

The inverted number $y^{-1}$ and also the first approximation value appr1 are then multiplied by the shift and addition stages 13 according to the relationship specified above. In the case presently being described, the unit 13 is realized for this purpose from a parallel arrangement comprising 6 shift and addition stages (this is sufficient for the calculation of the modulo operation in the case of the UMTS standard).

The construction of the address generator 10 is thus based on the following mathematical relationship:

$$(v*s(j-1))/p = (v*s(j-1))/2^x * (p/2^x)^{-1} \text{ or}$$

$$a/p = a/2^x * (p/2^x)^{-1}.$$

In this case, $(v*s(j-1))/2^x$ or $a/2^x$ is approximated by the expression $RV((v*s(i-1)))|x)$ or $RV(a|x)$ and $(p/2^x)$ is approximated by the expression $RV(p|x)$, bits of the significances 1, ½, . . . , 1/32 being taken into consideration in the second case. Then, as already mentioned, the inverted number $y^{-1}$ is calculated with an accuracy of a word width of 6 bits at most. In order that the second approximation value appr2 is an integer, bits of a smaller significance than $2^0$ are discarded in its binary representation.

The circuit furthermore comprises two subtractors 14 and 15. Both subtractors 14, 15 in each case receive the number a or the product v*s(i−1) at a first input 14.1 and 15.1 respectively. The subtractor 14 is connected by its second input 14.2 to an output of the memory 6, while the subtractor 15 is connected by its second input 15.2 to an output of the memory 7.

The result values of the subtractor 14 ($K_0 = v*s(i-1) - n_H*p$ or $K_0 = a - n_H*p$) and of the subtractor 15 ($K_+ = v*s(i-1) - (n_H + 1)*p$ or $K_+ = a - (n_H + 1)*p$) are forwarded to a unit for sign assessment 16. The latter is connected via a control line 17 to the control input of a multiplexer 18. The two multiplexer inputs of the multiplexer 18 are connected to the outputs of the subtractors 14 and 15. The result of the modulo calculation is output at the output 18.1 of the multiplexer 18.

Figure 2:
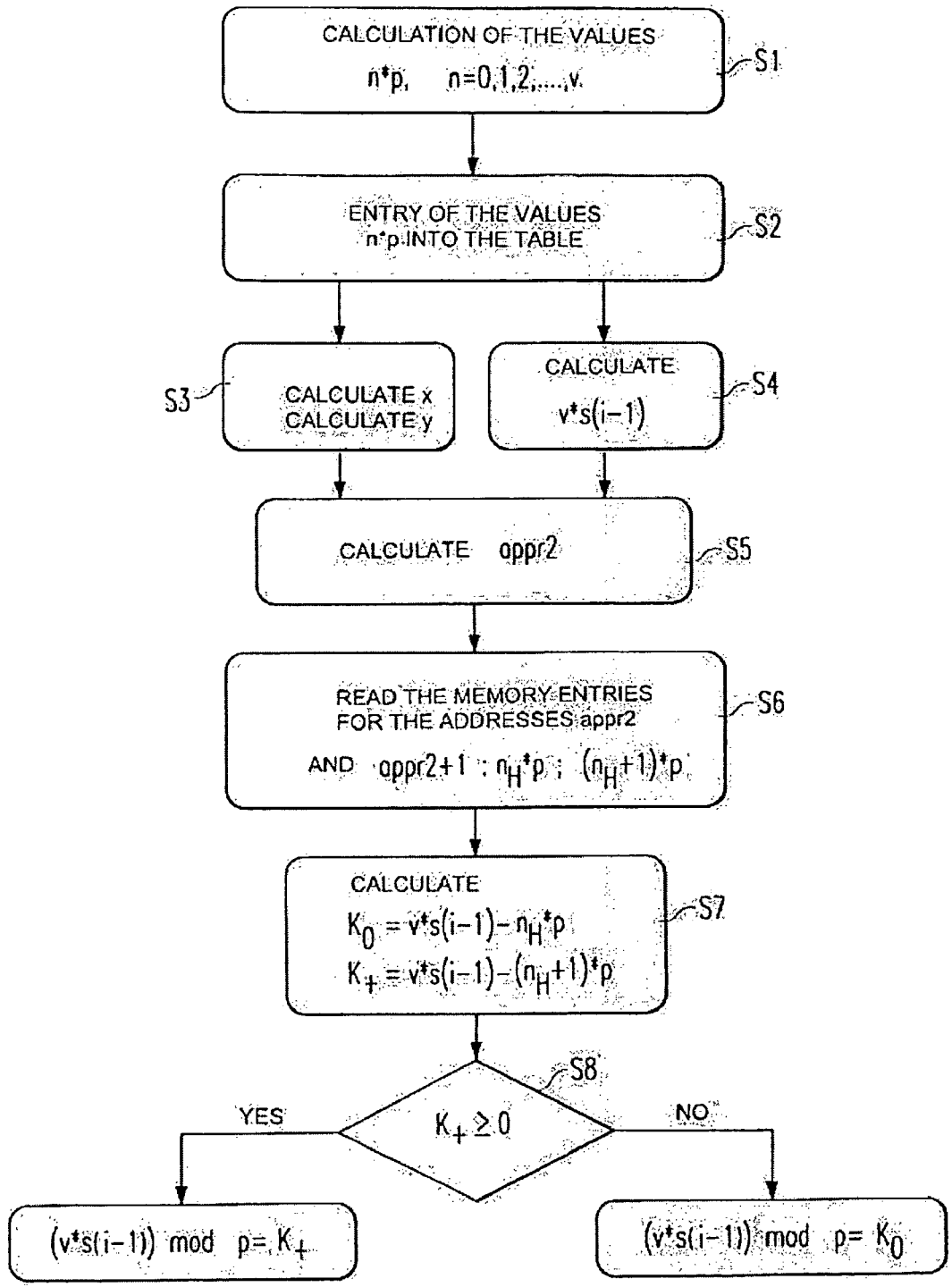
FIG. 2 shows a schematic illustration of a flow diagram for elucidating the method of operation of the circuit shown in FIG. 1.

FIG. 2 illustrates the functioning of the circuit shown in FIG. 1.

In a first step S1, the products n*p, n=0, 1, 2, . . . , v, are calculated by means of the state generator 2.

In the step S2, these values are entered into the table 1.

Afterwards, in the step S3, the place shift x and the correction value y are calculated using the first and second calculation units 8 and 9. If appropriate, the product v*s(i−1) is calculated in the step S4.

In the step S5, the second approximation value appr2 is determined in the manner already described.

In accordance with the relationship $n_H = appr2$, the two products $n_H*p$ and $(n_H + 1)*p$ are read out from the table 1, see step S6.

The calculation of the values $K_0$ and $K_+$ which is carried out in the step S7 is executed by means of the two subtractors 14 and 15.

In the step S8, the unit for sign assessment 16 checks whether $K_+ \geq 0$. If this is the case, the output of the subtractor 15 is passed to the output 18.1 of the multiplexer 18 via the control line 17. Otherwise ($K_+ < 0$) the output of the subtractor 14 is passed to the output 18.1 of the multiplexer 18.

The steps S6 to S8 can be modified in such a way that the product value $(n_H - 1)*p$ is furthermore read out from the table 1. In this case, the address determining unit 3 must additionally generate the address ADDR_$n_H - 1$, and the circuit must contain a further memory (corresponding to 6 or 7), a further subtractor (corresponding to 14 or 15) and a multiplexer 18 with 3 inputs. Furthermore, in this case in the step S7 the value $K_- = v*s(i-1) - (n_H - 1)*p$ or $K_- = a - (n_H - 1)*p$ is additionally calculated and forwarded to the unit 16 for sign assessment. In the case where K+<0, the latter unit has to carry out a further check, namely to determine whether $K_0 \geq 0$. If this is the case, the value $K_0$ is passed to the output 18.1; otherwise, the value $K_-$ is output.

Figure 3:
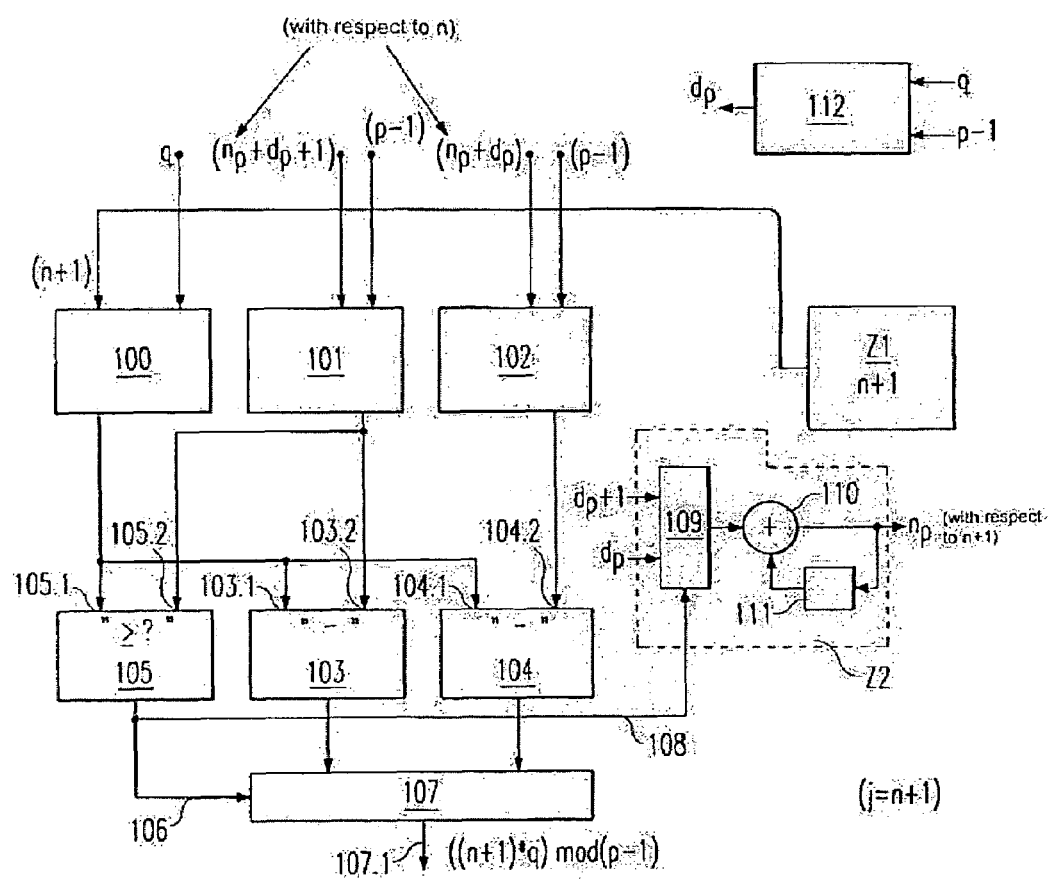
FIG. 3 shows a schematic illustration of a circuit example in accordance with the second aspect of the invention.

FIG. 3 shows a simplified illustration of a circuit diagram of a circuit in accordance with the second aspect of the invention.

The circuit comprises three multipliers 100, 101 and 102. Furthermore, two subtractors 103 and 104 and a first counter Z1 for the running index j are provided. The positive inputs 103.1 and 104.1 of the subtractors 103 and 104, respectively, are connected to the output of the first multiplier 100, while the subtraction input 103.2 of the subtractor 103 is connected to the output of the second multiplier 101 and the subtraction input 104.2 of the second subtractor 104 is connected to the output of the third multiplier 102.

The circuit furthermore comprises a comparator 105, the first input 105.1 of which is connected to the output of the first multiplier 100 and the second input 105.2 of which is connected to the output of the second multiplier 101.

The comparison result present at an output of the comparator 105 is forwarded to a multiplexer 107 via a control line 106 and to a second counter Z2 via a control line 108. The multiplexer 107 receives the output signals of the two subtractors 103 and 104 and outputs one of these output signals at its output 107.1 in a manner dependent on the value of the control signal 106.

The second counter Z2 comprises a multiplexer 109 and also an accumulator fed by the output of the multiplexer 109. The accumulator comprises an adder 110, one adder input of which is connected to the output of the multiplexer 109, and also a memory 111, which feeds the addition result present at the output of the adder 110 back to the other input of the adder 110.

Furthermore, the circuit comprises a unit 112 for forming a quotient and carrying out a rounding operation (disregarding of the places after the decimal point) on the quotient.

The circuit illustrated in FIG. 3 inductively calculates the sequence of the modulo operations (2). Its functioning is explained in more detail below with reference to FIGS. 3 and 4.

In an initial step S101 (see FIG. 4), the variable dp is determined from the numbers q and (p−1) by means of the unit 112.

$$dp = \text{int}[q/(p-1)]$$

In this case, int[q/(p−1)] designates the integer function applied to the quotient q/(p−1), the said integer function having the effect that dp is a positive integer.

The recursion for calculating the modulo expressions for the running index j is described below. The specifications of quantities illustrated in FIG. 3 relate to a snapshot at the instant j=n+1, i.e. the result ((n+1)*q) mod (p−1) is intended to be output at the output 107.1 of the multiplexer 107.

A transfer variable $n_p$ is already present at this instant (j=n+1), which transfer variable has been calculated in the preceding recursion step j=n and output at the output of the second counter Z2. This transfer variable $n_p$ (with respect to j=n) and also the variable dp are used in the following manner as input values for the units 101, 102 and 109:

The values $n_p$+dp+1 and p−1 are present at the two multiplication factor inputs of the second multiplier 101.

The values $n_p$+dp and p−1 are present at the two multiplication factor inputs of the third multiplier 102.

The values dp+1 and dp are present at the multiplexer inputs of the multiplexer 109.

The multiplication factor inputs of the first multiplier 100 receive the number q and the current running index j, i.e. n+1.

The comparator 105 then compares whether (n+1)*q ≧ ($n_p$+dp+1)*(p−1). If this is the case, the multiplexer 107 is driven via the control line 106 in such a way that the output of the first subtractor 103 is passed to the output of the multiplexer 107.1. The result is ((n+1)*q) mod (p−1)=(n+1)*q−($n_p$+dp+1)*(p−1).

Otherwise, the output of the second subtractor 104 is passed to the output 107.1 of the multiplexer 107. The result is ((n+1)*q) mod (p−1)=(n+1)*q−($n_p$+dp)*(p−1).

The decision taken by the comparator 105 furthermore influences the calculation of the transfer value $n_p$, which is used for the calculation of the next modulo operation. For this purpose, the multiplexer 109 is driven via the control line 108 in such a way that in the case where (n+1)*q ≧ ($n_p$+dp+1)*(p−1), the input of the multiplexer 109 which is supplied with the value dp+1 is passed to the input of the adder 110;

otherwise, the input of the multiplexer 109 which is supplied with the value dp is passed to the input of the adder 110.

The value $n_p$ which is thereupon output at the output of the second counter Z2 is calculated with respect to the running index j=n+1. It is pointed out once again that it does not correspond to the value $n_p$ specified as input value for the second and third multipliers 101, 102 in FIG. 3, which value $n_p$ has already been calculated by the second counter Z2 in the preceding step j=n.

Figure 4:
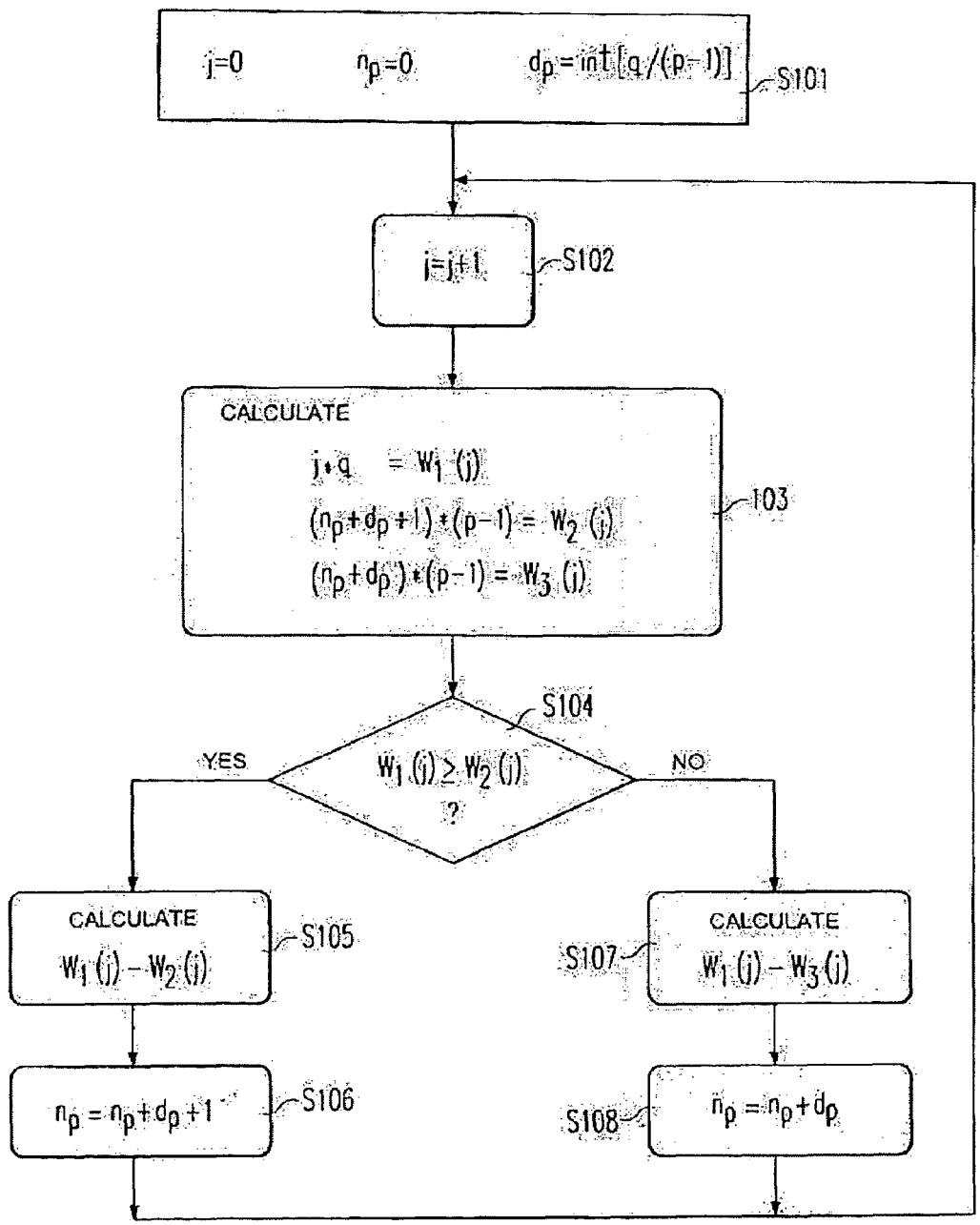
FIG. 4 shows a flow diagram for elucidating the functioning of the circuit shown in FIG. 3.

The recursion is explained briefly again with reference to the steps S102-S108 illustrated in FIG. 4.

In the step S102, the running index j is incremented to the value j+1 by means of the first counter Z1.

In the step S103 the three products are calculated. The product calculated by the first multiplier 100 is designated by $W_1(j)$, the product calculated by the second multiplier 101 is designated by $W_2(j)$ and the product calculated by the third multiplier 102 is designated by $W_3(j)$.

In the step S104, the comparator 105 performs the comparison $W_1(j) \geqq W_2(j)$.

If this relation is fulfilled, the sequence undergoes transition to the steps S105 and S106. In the step S105, the value $W_1(j)-W_2(j)$ is calculated as the result of the modulo calculation and, in the step S106 the previous transfer value $n_p$ is increased by the value dp+1.

If the relation that is checked in step S104 is not fulfilled, the sequence undergoes transition to the steps S107 and S108. In the step S107, the value $W_1(j)-W_3(j)$ is calculated as the result of the modulo calculation and, in the step S108, the previous transfer value $n_p$ is increased by the value dp.

Finally, it is also pointed out that, in the case of the intra-row permutation for UMTS, the values dp and q are dependent on the row of the coordinate transformation matrix that is considered, i.e. are specified with a row index i in the form $dp_i$ and $q_i$.

What is common to the two circuits illustrated in FIGS. 1 and 3 is that they can be embodied completely in hardware. By way of example, they may be realized as an external coprocessor. The digital signal processor used for general signal processing is connected to this external coprocessor and accesses the coprocessor for processing the modulo operations (for the interleaving/deinterleaving applications in UMTS or else for further applications in which a modulo calculation has to be carried out. In this case, the processing of the modulo operations in hardware requires only one cycle, independently of the bit width of the digital signal processor. Since the access to such a coprocessor generally requires two cycles, what may be achieved is that the processing time for the modulo operation is determined solely by the access time to the coprocessor.

I claim:

1. A method for calculating a modulo operation a mod p using a table containing the values n*p for n=1, 2, . . . where a and p are positive integers and a mod p=a−n*p, comprising:

calculating, by a unit, an integral hypothesis $n_H$ for the unknown value n;

looking up, by a unit, the value $n_H$*p and also at least one adjacent value $(n_H+1)$*p and/or $(n_H-1)$*p in the table;

calculating, by a unit, the expression a−$n_H$*p and also at least one of the expressions a−$(n_H+1)$*p and/or a−$(n_H-1)$*p and comparing at least one of these expressions with the value 0; and outputting, by a unit, the value a−n*p determined on the basis of the comparison, wherein the method is used for calculating an intra-row permutation in the course of interleaving and/or deinterleaving of a bit stream according to a mobile radio standard.

2. The method according to claim 1, wherein calculating the integral hypothesis $n_H$ comprises:

calculating a first approximation value for a/p of the form $a/2^x$, where x is a positive integer and is determined such that $2^x \leqq p < 2^{x+1}$ holds true;

calculating $n_H$ from the first approximation value by disregarding the places after the decimal point of the approximation value.

3. The method according to claim 2, wherein the first approximation value is calculated by right shifting the binary representation of a by x places.

4. The method according to claim 2, wherein the least significant bit of the binary representation of the first approximation value has the significance $2^0$.

5. The method according to claim 1, wherein calculating the integral hypothesis $n_H$ comprises:

calculating a first approximation value for a/p of the form $a/2^x$, where x is a positive integer;

calculating a correction value of the form $p/2^x$;

inverting the correction value;

calculating a second approximation value as a product of the first approximation value and the inverted correction value; and calculating $n_H$ from the second approximation value by disregarding the places after the decimal point of the second approximation value.

6. The method according to claim 5, wherein x is determined such that $2^x \leq p < 2^{x+1}$ holds true.

7. The method according to claim 5, wherein the correction value is calculated by right shifting the binary representation of p by x places.

8. The method according to claim 7, wherein the least significant bit of the binary representation of the correction value has the significance $2^{-t}$, where t is an integer greater than or equal to 1, in particular t=5.

9. The method according to claim 1, wherein s(i)=a mod p where a=v*s(i−1) holds true, where p is a prime number and v is an integer.

10. The method according to claim 9, wherein the mobile radio standard is the UMTS standard 3GPP TS 25.212.

11. A device for calculating a modulo operation a mod p, where a and p are positive integers and a mod p=a−n*p, comprising:

a table containing the values n*p for n=1, 2, . . . , a unit configured to calculate an integral hypothesis $n_H$ for the unknown value n, a unit configured to look up the value $n_H$*p and also at least one adjacent value $(n_H+1)$*p and/or $(n_H-1)$*p in the table, a unit configured to calculate the expressions a−$n_H$*p and also a−$(n_H+1)$*p and/or a−$(n_H-1)$*p and compare at least one of these expressions with the value 0, and a unit configured to output the value a−n*p determined on the basis of the comparison.

12. The device according to claim 11, wherein the unit configured to calculate an integral hypothesis $n_H$ contains a shift register, which carries out right shifting of the binary representation of the value of a by x places, where x is a positive integer and is determined such that $2^x \leq p < 2^{x+1}$ holds true.

13. The device according to claim 11, wherein the unit configured to calculate an integral hypothesis $n_H$ furthermore comprises a ROM table with $2^{t+1}$ entries and t+1 shift and addition stages, where t is a positive integer, in particular t=5.

14. The device according to claim 11, comprising a state generator configured to calculate the values n*p for the entries of the table.

* * * * *

UNITED STATES PATENT AND TRADEMARK OFFICE
CERTIFICATE OF CORRECTION

| | | |
|---|---|---|
| PATENT NO. | : 7,664,809 B2 | Page 1 of 1 |
| APPLICATION NO. | : 10/884724 | |
| DATED | : February 16, 2010 | |
| INVENTOR(S) | : Burkhard Becker | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1628 days.

Signed and Sealed this

Seventh Day of December, 2010

David J. Kappos
*Director of the United States Patent and Trademark Office*